United States Patent [19]
Akopian et al.

[11] 3,836,830
[45] Sept. 17, 1974

[54] POWER CAPACITOR SECTION

[76] Inventors: Vladimir Amayakovich Akopian, ulitsa Komitasa, 33, kv. 33; Jury Smbatovich Chatinian, ulitsa Tamaniana, 1, kv. 6, both of Erevan, U.S.S.R.

[22] Filed: Apr. 17, 1973

[21] Appl. No.: 352,028

[52] U.S. Cl. ............................. 317/261, 317/260
[51] Int. Cl. ............................................... H01g 1/00
[58] Field of Search ................... 317/261, 260, 242

[56] References Cited
UNITED STATES PATENTS
965,992    8/1910    Dean ................................. 317/260

FOREIGN PATENTS OR APPLICATIONS
611,667    2/1926    France ............................. 317/261
247,881    2/1926    Great Britain ................... 317/261
479,978    4/1953    Italy .................................. 317/261

OTHER PUBLICATIONS

Grouse, "Interim Report on Metalized Products Co. High Volt Metallized Capacitor" Brochure Metallized Prod. Co. Inc. Norwalk Conn. 1963 (Cover Page + FIG. 5 only).

*Primary Examiner*—E. A. Goldberg
*Attorney, Agent, or Firm*—Eric H. Waters

[57] ABSTRACT

A power capacitor section comprising three layers of a dielectric material and metal plates, characterized, according to the invention, in that one of the metal plates is a metal coating layer applied to the surface of one of the dielectric layers, while the other metal plate consists of two foil plates placed on the surface of the other non-metallized dielectric layer with the metal coating layer overlapping the foil plates.

5 Claims, 4 Drawing Figures

PATENTED SEP 17 1974 3,836,830

POWER CAPACITOR SECTION

The present invention relates to capacitors and more particularly to a power capacitor section for use in a capacitor operating at an alternating voltage and self-healing in case of a break-down.

Power capacitor sections are normally made of a multilayer dielectric, with plates made either of aluminum foil or of thin layers of metal coating obtained by way of deposition of a metal by vacuum evaporation.

A major disadvantage of some of said capacitor sections, for example, those made of aluminum foil, is that they become disabled in case of a local deterioration or breakdown of the dielectric and they are not self-healing.

A basic disadvantage of other sections made of layers of metal coating is poor heat conduction of the section or lamination of a capacitor.

An object of the present invention is to provide a power capacitor section which is self-healing in case of a break-down.

Another object of the present invention is to provide a capacitor section having good heat conduction and a reliable contact with the plates.

A fuller understanding of the nature of the present invention will be had from the following detailed description of examples embodiments thereof with reference to the accompanying drawings, wherein.

Figure 1:
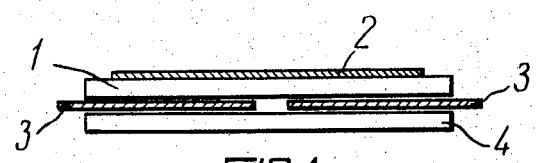
FIG. 1 is a schematic representation of a capacitor section with protruding foil plates for the case when it is necessary to have two layers of a dielectric between the plates.

It can be seen from FIG. 1 that the capacitor section is made up of one layer 1 of a dielectric material with a metal coating (a layer 2 of metal coating) obtained through the evaporation of metal in vacuum, two foil plates 3, for example, aluminum foil, and one interlaying (non-metallized) layer 4 of a dielectric. The metal coating layer 2 attached to the dielectric layer 1 is somewhat recessed at the fringes, thus making for the required electric strength between the foil plates 3 and the metal coating layer 2. The foil plates 3 are arranged between the dielectric layers 1 and 4 in one plane with a seal to ensure an adequate electric strength therebetween and somewhat protrude from the ends of the section.

Figure 2:
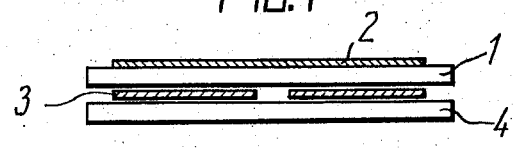
FIG. 2 is a schematic representation of the capacitor section of FIG. 1 with concealed foil plates.

The capacitor section can also be arranged with concealed foil plates as is shown in FIG. 2, wherein the foil plates 3 do not protrude from the ends of the section.

Figure 3:
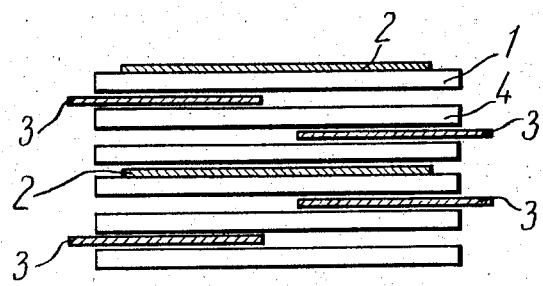
FIG. 3 is a schematic representation of a capacitor section with a multilayer dielectric (six layers) with protruding foil plates.

In case the capacitor section has three or more layers of a dielectric, the foil plates 3 (FIG. 3) are placed with respect to the metal coating layer 2 as shown in FIGS. 1 and 2, although with respect to each other the foil plates 3 are additionally insulated by the non-metallized dielectric layer 4, i.e. they are arranged on the opposite sides of the dielectric layer 4 rather than in one plane.

Figure 4:
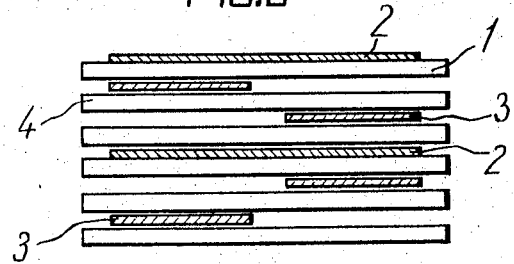
FIG. 4 is a schematic representation of the capacitor section of FIG. 3 with concealed foil plates.

Such an embodiment of the capacitor section makes it possible to enhance the electric strength between the foil plates for high-voltage capacitors and provides for an additional insulation layer between the plates. Such sections can be made both with protruding (FIG. 3) and concealed metal plates (FIG. 4).

In all the foregoing alternative embodiments, operating voltage is supplied to the two foil plates 3. The section is provided with a terminal in a conventional manner (soldering and metal pulverization for sections with protruding foil plates, and inserts for sections with concealed foil plates).

The solid dielectric may be any sheet and tape capacitor materials (paper, synthetic films), both impregnated and non-impregnated.

What is claimed is:

1. A power capacitor section comprising three juxtaposed dielectric layers, one of said layers having an outer surface, a metal coating applied to substantially the entire said outer surface of said one dielectric layer, and two metal foil plates, one foil plate being interposed between the other surface of said one layer and the adjacent surface of a second layer, the second foil plate being interposed between the other surface of the second plate and a third dielectric layer, said foil plates being laterally offset from one another in non-superposed relation but collectively extending substantially across the entire width of the dielectric layers.

2. A power capacitor section as claimed in claim 1 comprising an additional superposed unit comprising three dielectric layers with associated metal layer and foil plates on the first unit of three dielectric layers with associated metal layers and foil plates.

3. A power capacitor section as claimed in claim 1 wherein said foil plates project beyond the lateral edges of the dielectric layers.

4. A power capacitor section as claimed in claim 1 wherein said foil plates are recessed with respect to the lateral edges of the dielectric layers.

5. A power capacitor section as claimed in claim 1 wherein the offset metal foil plates of one unit are reversed with respect to the foil plates of the other unit.

* * * * *